(12) United States Patent
Meier

(10) Patent No.: US 10,845,601 B1
(45) Date of Patent: Nov. 24, 2020

(54) AR/VR CONTROLLER WITH EVENT CAMERA

(71) Applicant: Apple Inc., Cupertino, CA (US)

(72) Inventor: Peter Meier, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/263,293

(22) Filed: Jan. 31, 2019

Related U.S. Application Data

(60) Provisional application No. 62/627,353, filed on Feb. 7, 2018.

(51) Int. Cl.
*G02B 27/01* (2006.01)
*G06F 3/01* (2006.01)
(Continued)

(52) U.S. Cl.
CPC ........ *G02B 27/0172* (2013.01); *A63F 13/211* (2014.09); *A63F 13/213* (2014.09);
(Continued)

(58) Field of Classification Search
CPC .............. G02B 27/0172; G02B 27/017; G02B 27/0093; G02B 2027/014; G02B 2027/0138; G02B 2027/0178; G02B 6/0068; G02B 6/0073; G06F 3/013; G06F 3/011; G06F 3/012; G06F 3/0308; G06F 3/0325; G06F 3/0304; G06F 3/033; G06F 3/038; G06F 3/005; G06F 3/042; G06F 3/04815; G06T 7/80; G06T 7/248; G06T 7/586; G06T 2207/30204; H04N 9/3164; H04N 13/246; H04N 13/106; H04N 13/344; H04N 13/271; H04N 5/2256; A63F 13/213; A63F 13/211; A63F 13/42
See application file for complete search history.

(56) References Cited

U.S. PATENT DOCUMENTS

| | | | |
|---|---|---|---|
| 10,019,057 B2 * | 7/2018 | Osman | G06T 19/006 |
| 10,338,675 B2 * | 7/2019 | Yoon | G06T 7/80 |
| 10,540,023 B2 * | 1/2020 | Kim | G06F 3/03547 |
| 2010/0201808 A1 * | 8/2010 | Hsu | G06F 3/0325 |
| | | | 348/135 |
| 2014/0292755 A1 | 10/2014 | Nagase et al. | |
| 2014/0375541 A1 * | 12/2014 | Nister | A61B 3/113 |
| | | | 345/156 |

(Continued)

OTHER PUBLICATIONS

Ardouin, Jerome, et al., "Stereoscopic Rendering of Virtual Environments with Wide Field-of-Views up to 360", IEEE Virtual Reality, IEEE VR'14, Mar. 2014, Minneapolis, Minnesota, US, 2014.<hal-00924123v1>.

*Primary Examiner* — Dismery Mercedes
(74) *Attorney, Agent, or Firm* — Thompson Hine LLP

(57) ABSTRACT

In one implementation, a method involves obtaining light intensity data from a stream of pixel events output by an event camera of a head-mounted device ("HMD"). Each pixel event is generated in response to a pixel sensor of the event camera detecting a change in light intensity that exceeds a comparator threshold. A set of optical sources disposed on a secondary device that are visible to the event camera are identified by recognizing defined illumination parameters associated with the optical sources using the light intensity data. Location data is generated for the optical sources in an HMD reference frame using the light intensity data. A correspondence between the secondary device and the HMD is determined by mapping the location data in the HMD reference frame to respective known locations of the optical sources relative to the secondary device reference frame.

20 Claims, 7 Drawing Sheets

(51) Int. Cl.
  *G06F 3/03*     (2006.01)
  *A63F 13/213*   (2014.01)
  *G02B 27/28*    (2006.01)
  *G06T 7/80*     (2017.01)
  *H04N 13/254*   (2018.01)
  *G06F 3/038*    (2013.01)
  *A63F 13/211*   (2014.01)

(52) U.S. Cl.
  CPC ....... *G02B 27/017* (2013.01); *G02B 27/0176* (2013.01); *G02B 27/281* (2013.01); *G06F 3/012* (2013.01); *G06F 3/013* (2013.01); *G06F 3/0308* (2013.01); *G06F 3/038* (2013.01); *G06F 3/0325* (2013.01); *G06T 7/80* (2017.01); *H04N 13/254* (2018.05); *G02B 2027/014* (2013.01); *G02B 2027/0125* (2013.01); *G02B 2027/0138* (2013.01); *G02B 2027/0187* (2013.01)

(56) References Cited

U.S. PATENT DOCUMENTS

| | | | |
|---|---|---|---|
| 2015/0193018 A1* | 7/2015 | Venable | G02B 27/017 345/158 |
| 2016/0171771 A1* | 6/2016 | Pedrotti | G02B 27/017 345/633 |
| 2017/0173453 A1* | 6/2017 | Huang | A63F 13/26 |
| 2017/0236252 A1 | 8/2017 | Nguyen et al. | |
| 2017/0322310 A1* | 11/2017 | Godbaz | H04N 13/122 |
| 2017/0352183 A1* | 12/2017 | Katz | G06T 19/006 |
| 2018/0108147 A1* | 4/2018 | Kim | G06F 3/011 |
| 2018/0176487 A1* | 6/2018 | Price | H04N 5/332 |
| 2018/0196509 A1* | 7/2018 | Trail | G02B 27/0093 |
| 2018/0315364 A1* | 11/2018 | Yamamoto | G09G 5/026 |
| 2018/0329517 A1* | 11/2018 | Steedly | G06F 3/0346 |
| 2018/0373348 A1* | 12/2018 | Price | G01B 11/026 |
| 2019/0146598 A1* | 5/2019 | Peri | G06F 3/017 345/158 |

\* cited by examiner

700

702 Obtain light intensity data indicative of an intensity of light incident on a plurality of pixel sensors from a stream of pixel events output by an event camera of a secondary device

704 Identify a set of optical sources among a plurality of optical sources disposed on an HMD that are visible to the event camera using the light intensity data

706 Generate location data for the set of optical sources in a secondary device reference frame using the light intensity data

708 Determine a correspondence between the HMD and the secondary device by mapping the location data in the secondary device reference frame to respective known locations of optical sources of the set of optical sources relative to an HMD reference frame

AR/VR CONTROLLER WITH EVENT CAMERA

CROSS-REFERENCE TO RELATED APPLICATION

This Application claims the benefit of U.S. Provisional Application Ser. No. 62/627,353 filed Feb. 7, 2018, which is incorporated herein in its entirety.

TECHNICAL FIELD

The present disclosure generally relates to systems, methods, and devices for determining correspondences between head-mounted devices and physically unassociated secondary devices, and in particular, to determining correspondences between head-mounted devices and physically unassociated secondary devices using event camera data.

BACKGROUND

Head-mounted devices ("HMD") (also known as headsets) are often used in augmented reality ("AR") and virtual reality ("VR") systems to present a user with virtual graphical objects that either complement or replace a surrounding real-world environment in the user's field of view. To enhance that virtualized experience, AR/VR systems may include a secondary device that enables the user to interact with the virtual graphical objects. For example, the secondary device may correspond to a sword or other implement in the context of the virtualized experience. The AR/VR system may update a depiction of the sword in the virtualized experience to mirror a movement of the secondary device by tracking a correspondence between the secondary device and the HMD or another device.

An existing technique for determining such correspondences involves identifying a position and orientation of the secondary controller and tracking that position and orientation over time using image data obtained from one or more conventional frame-based cameras. The steadily increasing resolution offered by such frame-based cameras (e.g., 10-20 megapixels or more) enables AR/VR systems to identify and track secondary device positions and orientations with increasing precision.

However, tradeoff exist with that increasing precision. Image data from conventional frame-based cameras includes information regarding an absolute light intensity at each pixel sensor of the frame-based camera. When that per-pixel information regarding absolute light intensity is multiplied by the 10-20 million pixels included in a 10-20 megapixel camera, the AR/VR system has a substantial amount of data to process in determining a correspondence between an HMD and a secondary device. As such, some tradeoffs that come with that increased precision offered by the increasing resolutions of frame-based cameras include the increased latency and increased power budget required to process that substantial amount of data.

SUMMARY

Various implementations disclosed herein include devices, systems, and methods for determining correspondences between a head-mounted device ("HMD") and a secondary device physically unassociated with the HMD using event camera data. One example method involves obtaining, at an HMD with an event camera, light intensity data indicative of an intensity of light incident on a plurality of pixel sensors from a stream of pixel events output by the event camera. The plurality of pixel sensors are disposed on the event camera at known locations relative to an HMD reference frame. At least a portion of the light is emitted by a plurality of optical sources disposed on the secondary device at known locations relative to a secondary device reference frame. Each respective pixel event is generated in response to a particular pixel sensor detecting a change in light intensity that exceeds a comparator threshold. A set of optical sources among the plurality of optical sources that are visible to the event camera are identified by recognizing defined illumination parameters associated with the set of optical sources using the light intensity data. Location data is generated for the set of optical sources in the HMD reference frame using the light intensity data. The correspondence between the secondary device and the HMD is determined by mapping the location data in the HMD reference frame to respective known locations of optical sources of the set of optical sources relative to the secondary device reference frame.

In another implementation, a system includes an HMD, a secondary device physically unassociated with the HMD, and a first control node communicatively coupled to the secondary device. The HMD includes a plurality of optical sources to emit light. The plurality of optical sources are disposed at known locations relative to an HMD reference frame. The secondary device includes an event camera having a plurality of pixel sensors arranged to receive the light emitted by the plurality of optical sources. The event camera outputs a stream of pixel events generated by the plurality of pixel sensors. Each of the plurality of pixel sensors is disposed on the event camera at a known location relative to a secondary device reference frame and adapted to generate a respective pixel event in response to a breach of a respective comparator threshold indicative of an intensity of light incident on a respective pixel sensor. The control node determines a correspondence between the HMD and the secondary device by mapping location data generated in a secondary device reference frame for a set of optical sources among the plurality of optical sources to respective known locations of the set of optical sources relative to the HMD reference frame. The set of optical sources are uniquely identified by recognizing defined illumination parameters associated with the set of optical sources in light intensity data obtained from the stream of pixel events.

In another implementation, a system includes an HMD, a secondary device physically unassociated with the HMD, and a first control node communicatively coupled to the HMD. The HMD includes a first plurality of optical sources to emit light and a first event camera to output a first stream of pixel events generated by a first plurality of pixel sensors. The first plurality of optical sources and the first plurality of pixel sensors are disposed at known locations relative to an HMD reference frame. The secondary device includes a second plurality of optical sources to emit light and a second event camera to output a second stream of pixel events generated by a second plurality of pixel sensors. The second plurality of optical sources and the second plurality of pixel sensors are disposed at known locations relative to a secondary device reference frame. The first control node determines correspondences between the HMD and the secondary device by mapping location data generated in an HMD reference frame for a set of second optical sources among the second plurality of optical sources to respective known locations of the set of second optical sources relative to the secondary device reference frame. The set of second optical sources are identified by recognizing defined illumination parameters associated with the set of second optical sources in light intensity data obtained from the first stream of pixel events.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flow-chart illustrating an example of a method for determining a correspondence between an HMD and a secondary device physically unassociated with the HMD.

Figure 1:
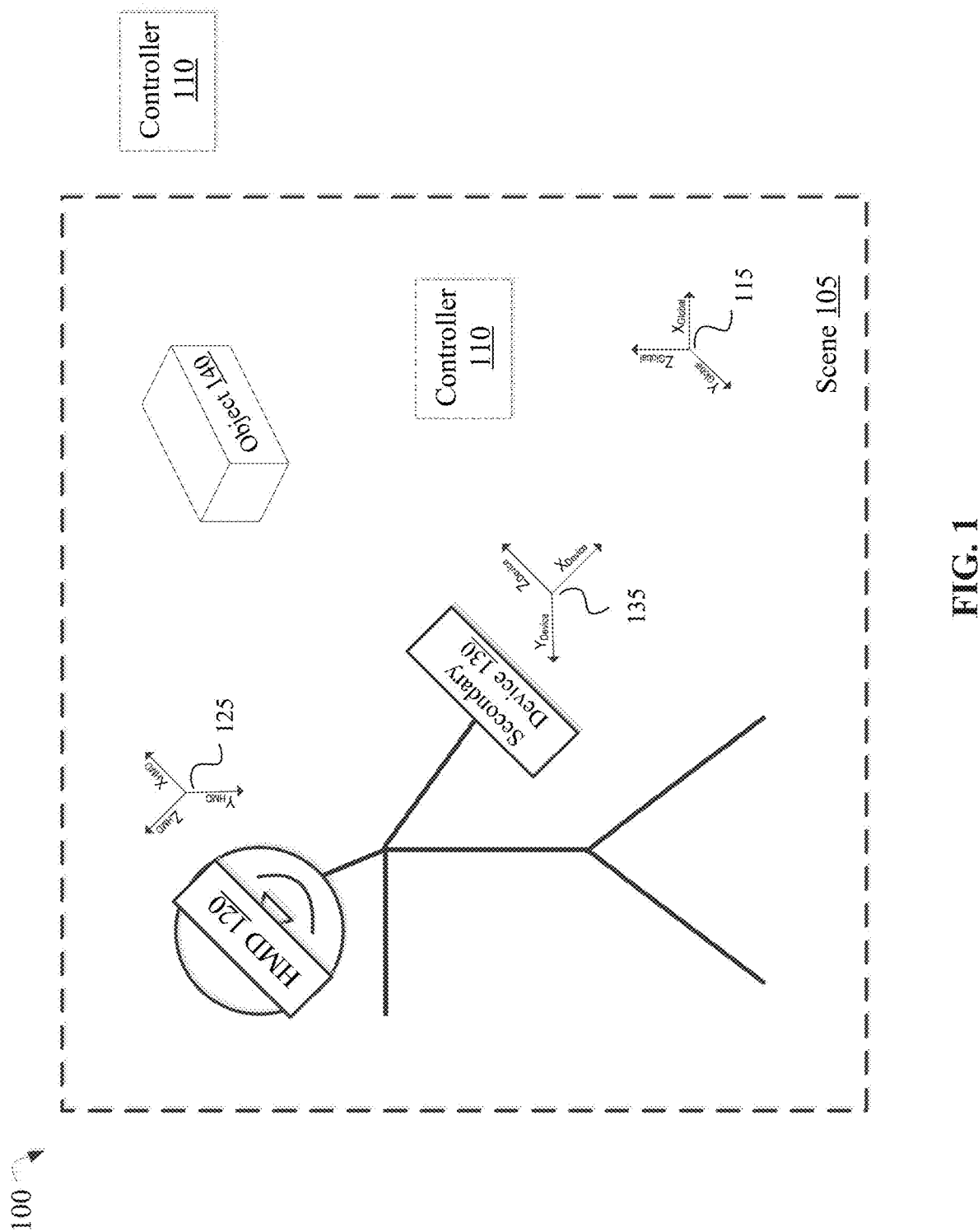
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present invention is illustrated and designated generally 100. In general, operating environment 100 represents the various devices involved in presenting a user with an augmented reality ("AR") experience and/or a virtual reality ("VR") experience. As depicted in the example of FIG. 1, operating environment 100 includes a controller 110, a head-mounted device ("HMD") 120, and a secondary device 130. In some implementations, each of controller 110, HMD 120, and secondary device 130 includes a suitable combination of software, firmware, and/or hardware.

To present a user with an AR experience, natural sensory information that the user perceives from a real-world environment proximate to the user (e.g., scene 105) is overlaid with virtual sensory information (e.g., two-dimensional ("2D") and/or three-dimensional ("3D") graphical content, sounds, tactile feedback, and the like) generated or at least processed by a computing device. That is, the virtual sensory information that is presented to a user as part of an AR experience ("augmented content") coexists with natural sensory information of the real-world environment. For example, the real-world environment, as represented by scene 105, may include object 140. If object 140 is a chair and the augmented content is a video game character in this example, the user may see the video game character sitting in the chair as part of an AR experience.

In contrast, to present a user with a VR experience, at least a portion of the natural sensory information that the user perceives from a real-world environment proximate to the user (e.g., scene 105) is replaced with virtual sensory information. In this instance, the virtual information that is presented to a user as part of a VR experience ("virtual content") would replace at least a portion of the natural sensory information of the real-world environment. Continuing with the example above, the user may see the video game character sitting in a vehicle as the vehicle proceeds down a road, as part of a VR experience. As part of the VR experience, that virtual content (i.e., the video game character, vehicle, and road) would replace object 104 in a field of view of the user.

In operating environment 100, controller 110 is configured to manage and coordinate an AR/VR experience for a user. Controller 110 is described in greater detail below with respect to FIG. 8. In one implementation, controller 110 generates graphics data for display on a screen of HMD 120. In one implementation, controller 110 is a computing device that is local to scene 105. For example, controller 110 may be implemented as a local server (e.g., a video game console) within scene 105. In one implementation, controller 110 is a computing device that is remote from scene 105. For example, controller 110 may be implemented as a remote server (e.g., a cloud server, an application server, a central server, and the like) external to scene 105. In one implementation, controller 110 is communicatively coupled with HMD 120 and/or secondary device 130 via one or more wired and/or wireless communication channels (e.g., BLUETOOTH, IEEE 802.11x, IEEE 802.16x, IEEE 802.3x, and the like).

AR/VR content is presented to the user in scene 105, as part of the AR/VR experience, via HMD 120. HMD 120 is described in greater detail below with respect to FIG. 9. In one implementation, the user wears HMD 120 on his/her head. In one implementation, HMD 120 includes a screen to display AR/VR content in a field-of-view of the user. In one implementation, a screen to display AR/VR content in a field-of-view of the user is provided by a portable computing device (e.g., a smartphone, a tablet, and the like) that is coupled to HMD 120. In some implementations, the functionalities of controller 110 are provided by and/or combined with HMD 120.

The user modifies (or otherwise interacts with) the AR/VR content, as part of the AR/VR experience, using secondary device 130. To that end, in some implementations, secondary device 130 is configured to provide user input to controller 110. One way that secondary device 130 provides user input to controller 110 to modify the AR/VR content presented via HMD 120 involves user input mechanisms. For example, secondary device 130 may include one or more user input mechanisms. In this example, the user may cause secondary device 130 to send a corresponding instruction (or command) to controller 110 and/or HMD 120 by manipulating the one or more user input mechanisms. Upon receiving that instruction, controller 110 and/or HMD 120 would modify the AR/VR content presented to the user via HMD 120 in accordance with that instruction. In one implementation, the one or more user input mechanisms include a physical input mechanism (e.g., a button, joystick, switch, knob, dial, and the like). In one implementation, the one or more user input mechanisms include a simulated input mechanism (e.g., a softkey, a virtual keyboard, and the like).

Another way that secondary device 130 provides user input to controller 110 to modify the AR/VR content presented via HMD 120 involves changing correspondences (e.g., relative positions and/or orientations) between HMD 120 and secondary device 130. In various implementations, light intensity data obtained from a stream of pixel events output by an event camera is used to determine those changing correspondences between HMD 120 and secondary device 130, as described below. Each respective pixel event is generated in response to a particular pixel sensor detecting a change in an intensity of light. An event camera may include or be referred to as a dynamic vision sensor ("DVS"), a silicon retina, an event-based camera, or a frame-less camera. Thus, the event camera generates (and transmits) data regarding changes in light intensity at each pixel sensor as opposed to data output by frame-based cameras regarding absolute light intensity at each pixel sensor.

Figure 2:
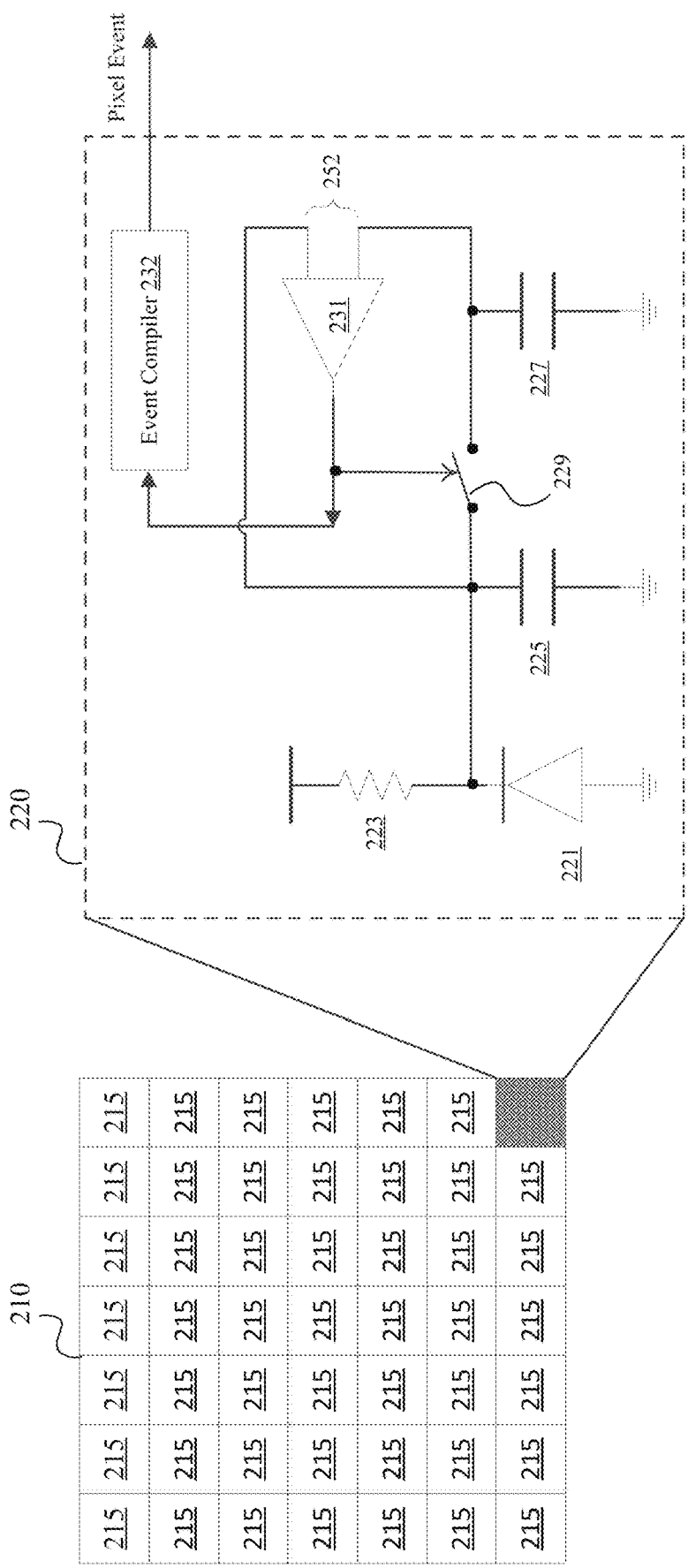
FIG. 2 is a block diagram of pixel sensors for an event camera and an example circuit diagram of a pixel sensor, in accordance with some implementations.

FIG. 2 is a block diagram of pixel sensors 215 for an event camera and an example circuit diagram 220 of a pixel sensor, in accordance with some implementations. As illustrated by FIG. 2, pixel sensors 215 may disposed on an event camera at known locations relative to a device frame (e.g., HMD reference frame 125 and secondary device reference frame 135 of FIG. 1) by arranging the pixel sensors 215 in a 2D matrix 210 of rows and columns. In the example of FIG. 2, each of the pixel sensors 215 is associated with an address identifier defined by one row value and one column value.

FIG. 2 also shows an example circuit diagram of a circuit 220 that is suitable for implementing a pixel sensor 215. In the example of FIG. 2, circuit 220 includes photodiode 221, resistor 223, capacitor 225, capacitor 227, switch 229, comparator 231, and event compiler 232. In operation, a voltage develops across photodiode 221 that is proportional to an intensity of light incident on the pixel sensor. Capacitor 225 is in parallel with photodiode 221, and consequently a voltage across capacitor 225 is the same as the voltage across photodiode 221.

In circuit 220, switch 229 intervenes between capacitor 225 and capacitor 227. Therefore, when switch 229 is in a closed position, a voltage across capacitor 227 is the same as the voltage across capacitor 225 and photodiode 221. When switch 229 is in an open position, a voltage across capacitor 227 is fixed at a previous voltage across capacitor 227 when switch 229 was last in a closed position. Comparator 231 receives and compares the voltages across capacitor 225 and capacitor 227 on an input side. If a difference between the voltage across capacitor 225 and the voltage across capacitor 227 exceeds a threshold amount ("a comparator threshold"), an electrical response (e.g., a voltage) indicative of the intensity of light incident on the pixel sensor is present on an output side of comparator 231. Otherwise, no electrical response is present on the output side of comparator 231.

When an electrical response is present on an output side of comparator 231, switch 229 transitions to a closed position and event compiler 232 receives the electrical response. Upon receiving an electrical response, event compiler 232 generates a pixel event and populates the pixel event with information indicative of the electrical response (e.g., a value and/or polarity of the electrical response). In one implementation, event compiler 232 also populates the pixel event with one or more of: timestamp information corresponding to a point in time at which the pixel event was generated and an address identifier corresponding to the particular pixel sensor that generated the pixel event.

An event camera generally includes a plurality of pixel sensors like pixel sensor 215 that each output a pixel event in response to detecting changes in light intensity that exceed a comparative threshold. When aggregated, the pixel events output by the plurality of pixel sensor form a stream of pixel events that are output by the event camera. In accordance with implementations of the present invention, light intensity data obtained from the stream of pixel events output by an event camera is used to determine the changing correspondences between HMD 120 and secondary device 130. When the event camera is disposed on one device among HMD 120 and secondary device 130, at least a portion of the changes in light intensity correspond to light emitted by a plurality of optical sources disposed on the other device among HMD 120 and secondary device 130.

Figure 3:
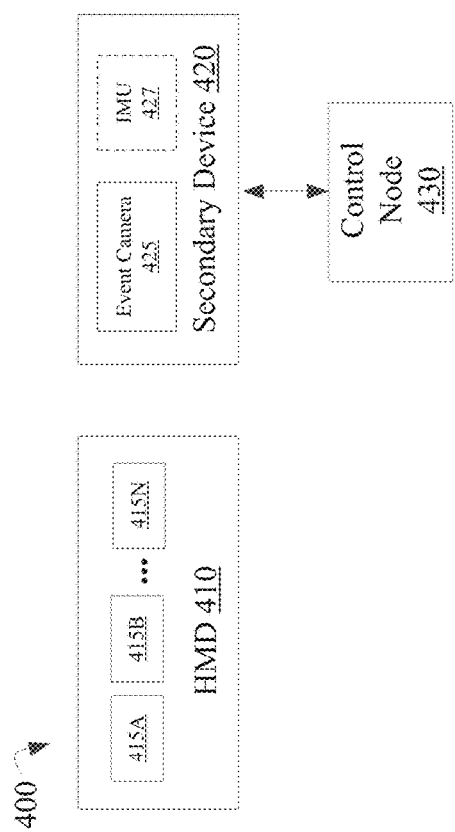
FIG. 3 is a block diagram of an example system that is suitable for implementing aspects of the present invention.
Figure 4:
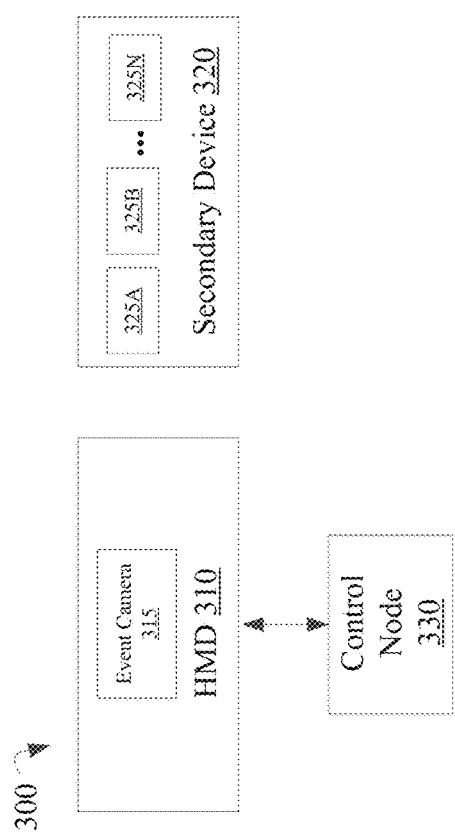
FIG. 4 is a block diagram of another example system that is suitable for implementing aspects of the present invention.
Figure 5:
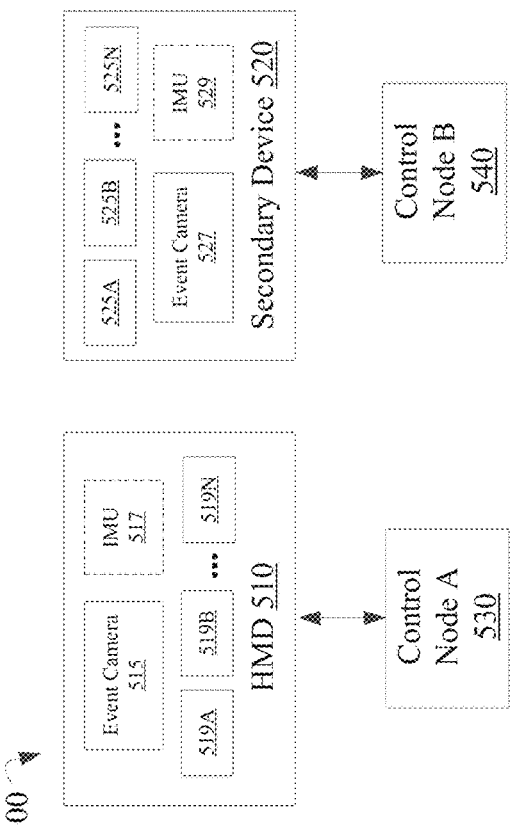
FIG. 5 is a block diagram of another example system that is suitable for implementing aspects of the present invention.

The systems depicted in FIGS. 3-5 provide various example configurations of how event cameras and optical sources may be distributed among an HMD and a secondary device, in accordance with aspects of the present invention. FIG. 3 is a block diagram of an example system 300 comprising HMD 310 and secondary device 320. In the configuration of FIG. 3, event camera 315 is disposed on HMD 310 whereas a plurality of optical sources 325A and 325B-325N are disposed on secondary device 320. System 300 also includes control node 330 that is communicatively coupled to HMD 310. Control node 330 is configured to determine a correspondence between secondary device 320 and HMD 310 using a stream of pixel events output by event camera 315, as described in greater detail below with respect to FIG. 6. In determining that correspondence, control node 330 identifies a set of optical sources among the plurality of optical sources 325A and 325B-325N disposed on secondary device 320 using light intensity data obtained from that stream of pixel events output by event camera 315.

FIG. 4 is a block diagram of an example system 400 comprising HMD 410 and secondary device 420. In the configuration of FIG. 4, a plurality of optical sources 415A and 415B-415N are disposed on HMD 410 and event camera 425 is disposed on secondary device 420. System 400 also includes control node 430 that is communicatively coupled to secondary device 420. Control node 430 is configured to determine a correspondence between HMD 410 and secondary device 420 using a stream of pixel events output by event camera 425, as described in greater detail below with respect to FIG. 7. In determining that correspondence, control node 430 identifies a set of optical sources among the plurality of optical sources 415A and 415B-415N disposed on HMD 410 using light intensity data obtained from that stream of pixel events output by event camera 425.

FIG. 5 is a block diagram of an example system 500 comprising HMD 510 and secondary device 520. In the configuration of FIG. 5, a plurality of optical sources and an event camera are disposed on both HMD 510 and secondary device 520. Specifically, event camera 515 and a plurality of optical sources 519A and 519B-519N are disposed on HMD 510 while a plurality of optical sources 525A and 525B-525N and event camera 527 is disposed on secondary device 520. System 500 also includes control node "A" 530 that is communicatively coupled to HMD 510 and control node "B" 540 that is communicatively coupled to secondary device 520.

Control node "A" 530 is configured to determine a correspondence between secondary device 520 and HMD 510 using a stream of pixel events output by event camera 515, as described in greater detail below with respect to FIG. 6. In determining that correspondence, control node "A" 530 identifies a set of optical sources among the plurality of optical sources 525A and 525B-525N disposed on secondary device 520 using light intensity data obtained from that stream of pixel events output by event camera 515. Control node "B" 540 is configured to determine a correspondence between HMD 510 and secondary device 520 using a stream of pixel events output by event camera 527, as described in greater detail below with respect to FIG. 7. In determining that correspondence, control node "B" 540 identifies a set of optical sources among the plurality of optical sources 519A and 519B-519N disposed on HMD 510 using light intensity data obtained from that stream of pixel events output by event camera 527.

In one implementation, light intensity data obtained from a stream of pixel events is filtered before propagating to a control node. To that end, a filter may intervene in a propagation path between a control node and a corresponding event camera. For example, a filter may intervene in a propagation path between: control node 330 and event camera 315 of FIG. 3; control node 430 and event camera 425 of FIG. 4; control node "A" 530 and event camera 515 of FIG. 5; and/or control node "B" 540 and event camera 527 of FIG. 5. The filter is configured to filter the light intensity data according to a frequency range to partition light intensity data corresponding to a visible wavelength range from light intensity data corresponding to a non-visible wavelength range.

In one implementation, a correspondence between an object in a scene disposed in a field of view of an event camera is determined using the light intensity data corresponding to the visible wavelength range. For example, a correspondence between object 140 in scene 105 and HMD 120 of FIG. 1 may be determined using the light intensity data corresponding to the visible wavelength range. As another example, a correspondence between a portion of a user (e.g., a hand, a foot, a leg, an arm, etc.) in scene 105 and HMD 120 may be determined using the light intensity data corresponding to the visible wavelength range. In one implementation, the light intensity data corresponding to the non-visible wavelength range corresponds to light emitted by a plurality of optical sources (e.g., optical sources 325A and 325B-325N, optical sources 415A and 415B-415N, optical sources 519A and 519B-519N, and/or optical sources 525A and 525B-525N). In one implementation, the plurality of optical sources comprise: an optical source to emit light in a near-infrared wavelength range, an optical source to emit light in an ultra-violet wavelength range, or a combination thereof.

As seen in FIGS. 4 and 5, in various implementations, an HMD and/or a secondary device may include an inertial measurement unit ("IMU"). For example, secondary device 420 of FIG. 4 includes IMU 427 whereas HMD 510 and secondary 520 of FIG. 5 include IMU 517 and IMU 529, respectively. An IMU is a computing device that provides inertial data by sampling signals generated by one or more sensors of the IMU. The one or more sensors may include one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, and the like.

When an IMU is coupled to a device (e.g., an HMD and/or a secondary device), the inertial data provided by the IMU corresponds to movement of that device in a global reference (or navigation) frame (e.g., global reference frame 115 of FIG. 1). In various implementations, inertial data provided by an IMU facilitates numerous functionalities. In one implementation, control node "A" 530 and control node "B" 540 are each further configured to resolve discrepancies between the respective correspondences (i.e., the correspondence between secondary device 520 and HMD 510 and the correspondence between HMD 510 and secondary device 520). The discrepancies are resolved using data (e.g., inertial data provided by IMU 517, inertial data provided by IMU 529, and/or tracking data provided by a tracking unit of a controller (e.g., controller 110)) exchanged between control node "A" 530 and control node "B" 540.

By way of example, if an IMU is coupled to HMD 120 of FIG. 1, HMD 120 may use inertial data provided by the IMU to normalize AR/VR content presented in a display of HMD 120 to global reference frame 115 (e.g., by determining an offset between HMD reference frame 125 and global reference frame 115). As another example, if secondary device 130 of FIG. 1 is implemented using secondary device 430 of FIG. 4, inertial data provided by IMU 427 would correspond to movement of secondary device 130 in global reference frame 115. In this implementation, control node 430 may use the inertial data provided by IMU 427 to normalize a determined correspondence between HMD 120 and secondary device 130 to global reference frame 115 (e.g., by determining an offset between secondary device reference frame 135 and global reference frame 115). In a similar example, if HMD 120 of FIG. 1 is implemented using HMD 510 of FIG. 5, inertial data provided by IMU 517 would correspond to movement of HMD 120 in secondary device reference frame 135. In this implementation, control node "A" 530 may use the inertial data provided by IMU 517 to normalize a determined correspondence between secondary device 130 and HMD 120 to global reference frame 115 (e.g., by determining an offset between HMD reference frame 125 and global reference frame 115).

In one implementation, the light intensity data is filtered to partition light intensity data corresponding to a visible wavelength range from light intensity data corresponding to a non-visible wavelength range. In one implementation, the light intensity data corresponding to the non-visible wavelength range includes the light emitted by the plurality of optical sources. In one implementation, a correspondence between an object in a scene disposed within a field of view of the event camera and the HMD is determined using the light intensity data corresponding to the visible wavelength range.

Figure 6:
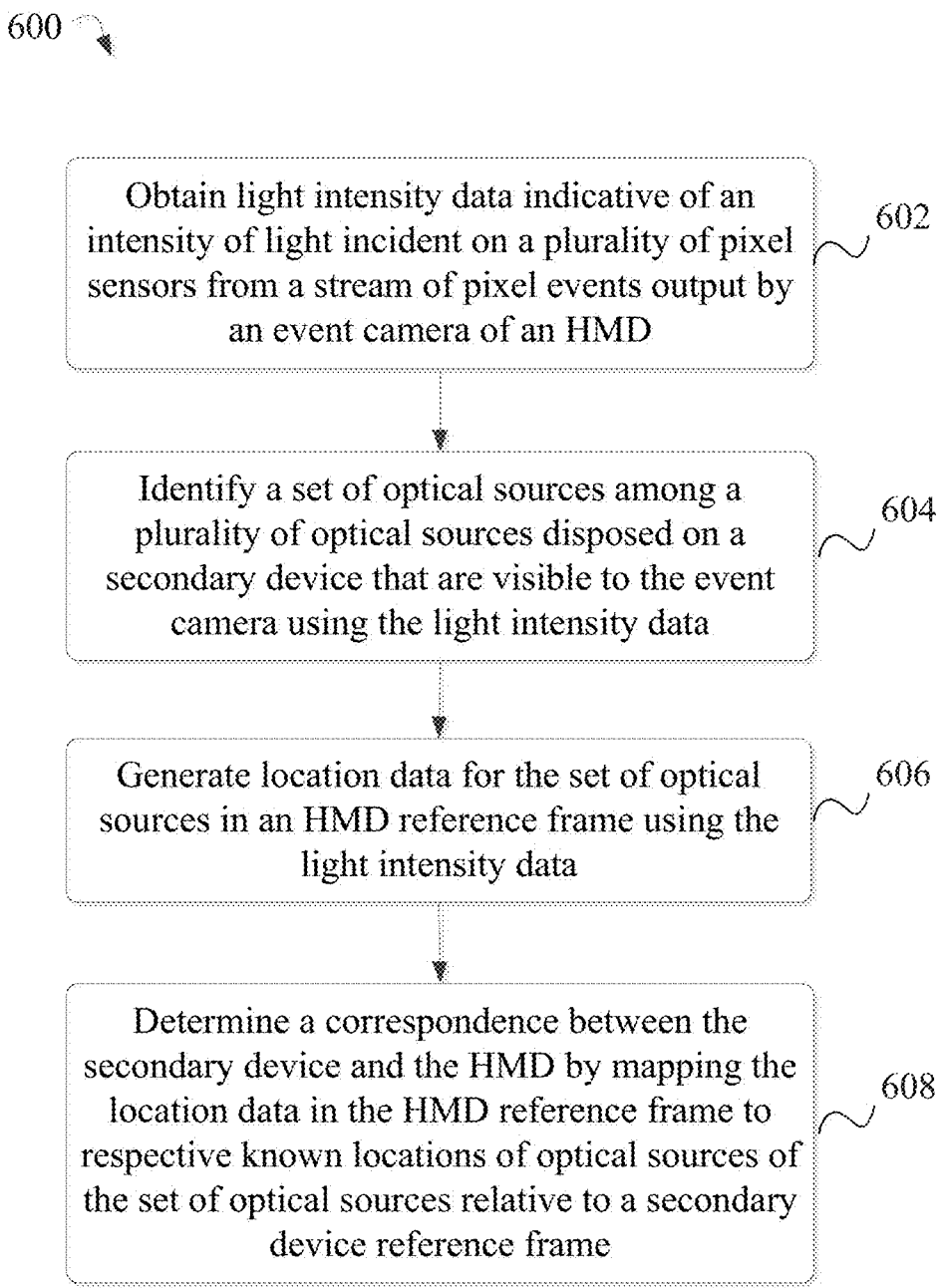
FIG. 6 is a flow-chart illustrating an example of a method for determining a correspondence between a secondary device and an head-mounted device ("HMD") physically unassociated with the secondary device.

Referring to FIG. 6, an example method 600 for determining a correspondence between a secondary device and an HMD physically unassociated with the secondary device is illustrated. In one implementation, method 600 is effectuated by control node 330 of FIG. 3 or control node "A" 530 of FIG. 5. At block 602, light intensity data indicative of an intensity of light incident on the plurality of pixel sensors is obtained from a stream of pixel events output by an event camera of the HMD. Each respective pixel event is generated in response to a particular pixel sensor detecting a change in light intensity that exceeds a comparator threshold. In one implementation, the stream of pixel events are output by event camera 315 of FIG. 3 or event camera 515 of FIG. 5. At least a portion of the light is emitted by a plurality of optical sources disposed on the secondary device at known locations relative to a secondary device reference frame. In one implementation, at least a portion of the light is emitted by optical sources 325A and 325B-325N disposed on secondary device 320 of FIG. 3 or optical sources 525A and 525B-525N disposed on secondary device 520 of FIG. 5.

At block 604, a set of optical sources among the plurality of optical sources that are visible to the event camera is identified by recognizing defined illumination parameters associated with the set of optical sources using light intensity data. In one implementation, the set of optical sources includes at least three optical sources of the plurality of optical sources. In one implementation, the light intensity data is filtered according to a frequency range prior to identifying the set of optical sources.

In one implementation, the defined illumination parameters include a first wavelength associated with light emitted by a first subset of optical sources and a second wavelength associated with light emitted by a second subset of optical sources that is different from the first wavelength. By way of example, the plurality of optical sources may include optical source "A" that emits light with a 900 nanometer ("nm") wavelength, optical source "B" that emits light with a 950 nm wavelength, and optical source "C" that emits light with a 1000 nm wavelength. In this example, light intensity data may be obtained that includes data corresponding to light with a 900 nm wavelength and light with a 950 nm wavelength. However, that light intensity data may not include data corresponding to light with a 1000 nm wavelength. By recognizing the light intensity data corresponding to the 900 nm wavelength and 950 nm wavelength lights, the control node may identify optical sources "A" and "B" as being visible to the event camera.

In one implementation, the defined illumination parameters include a portion of an illumination pattern of the plurality of optical sources that corresponds to the set of optical sources. For example, the plurality of optical sources may include optical source "A" that emits a 1 millisecond ("ms") burst of light every 5 ms, optical source "B" that emits a 2 ms burst of light every 6 ms, and optical source "C" that emits a 3 ms burst of light every 7 ms. By recognizing the light intensity data corresponding to the 2 ms burst of light every 6 ms and the 3 ms burst of light every 7 ms, the control node may identify optical sources "B" and "C" as being visible to the event camera. As another example, the plurality of optical sources may consistently emit light in a pre-defined sequence.

At block 606, location data for the set of optical sources is generated in an HMD reference frame using the light intensity data. In one implementation, generating the location data for the set of optical sources involves data obtained from a depth camera. In one implementation, generating the location data for the set of optical sources involves light intensity data obtained from a second camera that forms a stereoscopic pair with the event camera. In one implementation, generating the location data for the set of optical sources involves identifying key points in the light intensity data and mapping those key points to a three-dimensional model of the secondary device.

At block 608, the correspondence between the secondary device and the HMD is determined by mapping the location data in the HMD reference frame to respective known locations of optical sources relative to the secondary device reference frame. In one implementation, a display of the HMD is updated based on the determined correspondence between the secondary device and the HMD. In one implementation, the HMD includes an IMU to provide inertial data corresponding to movement of the HMD in a global reference frame. In one implementation, the HMD is adapted to normalize content presented in a display of the HMD to the global reference frame using the inertial data.

Referring to FIG. 7, an example method 700 for determining a correspondence between an HMD and a secondary device physically unassociated with the HMD is illustrated. In one implementation, method 700 is effectuated by control node 430 of FIG. 4 or control node "B" 540 of FIG. 5. At block 702, light intensity data indicative of an intensity of light incident on the plurality of pixel sensors is obtained from a stream of pixel events output by an event camera of the secondary device. Each respective pixel event is generated in response to a particular pixel sensor detecting a change in light intensity that exceeds a comparator threshold. In one implementation, the stream of pixel events are output by event camera 425 of FIG. 4 or event camera 527 of FIG. 5. At least a portion of the light is emitted by a plurality of optical sources disposed on the HMD at known locations relative to an HMD reference frame. In one implementation, at least a portion of the light is emitted by optical sources 415A and 415B-415N disposed on HMD 410 of FIG. 4 or optical sources 519A and 519B-5195N disposed on HMD 510 of FIG. 5.

At block 704, a set of optical sources among the plurality of optical sources that are visible to the event camera is identified by recognizing defined illumination parameters associated with the set of optical sources using light intensity data. In one implementation, the light intensity data is filtered according to a frequency range prior to identifying the set of optical sources. In one implementation, the defined illumination parameters include a first wavelength associated with light emitted by a first subset of optical sources and a second wavelength associated with light emitted by a second subset of optical sources that is different from the first wavelength. In one implementation, the defined illumination parameters include a portion of an illumination pattern of the plurality of optical sources that corresponds to the set of optical sources.

At block 706, location data for the set of optical sources is generated in a secondary device reference frame using the light intensity data. In one implementation, generating the location data for the set of optical sources involves data obtained from a depth camera. In one implementation, generating the location data for the set of optical sources involves light intensity data obtained from a second camera that forms a stereoscopic pair with the event camera. In one implementation, generating the location data for the set of optical sources involves identifying key points in the light intensity data and mapping those key points to a three-dimensional model of the HMD.

At block 708, the correspondence between the HMD and the secondary device is determined by mapping the location data in the secondary reference frame to respective known locations of optical sources relative to the HMD reference frame. In one implementation, a display of the HMD is updated based on the determined correspondence between the secondary device and the HMD. In one implementation, the secondary device includes an IMU to provide inertial data corresponding to movement of the secondary device in a global reference frame. In one implementation, the control node is adapted to normalize the correspondence between the HMD and the secondary device to the global reference frame using the inertial data.

In some implementations, method 600 and/or method 700 is performed by processing logic, including hardware, firmware, software, or a combination thereof. In some implementations, method 600 and/or method 700 is performed by a processor executing code stored in a non-transitory computer-readable medium (e.g., a memory).

Figure 8:
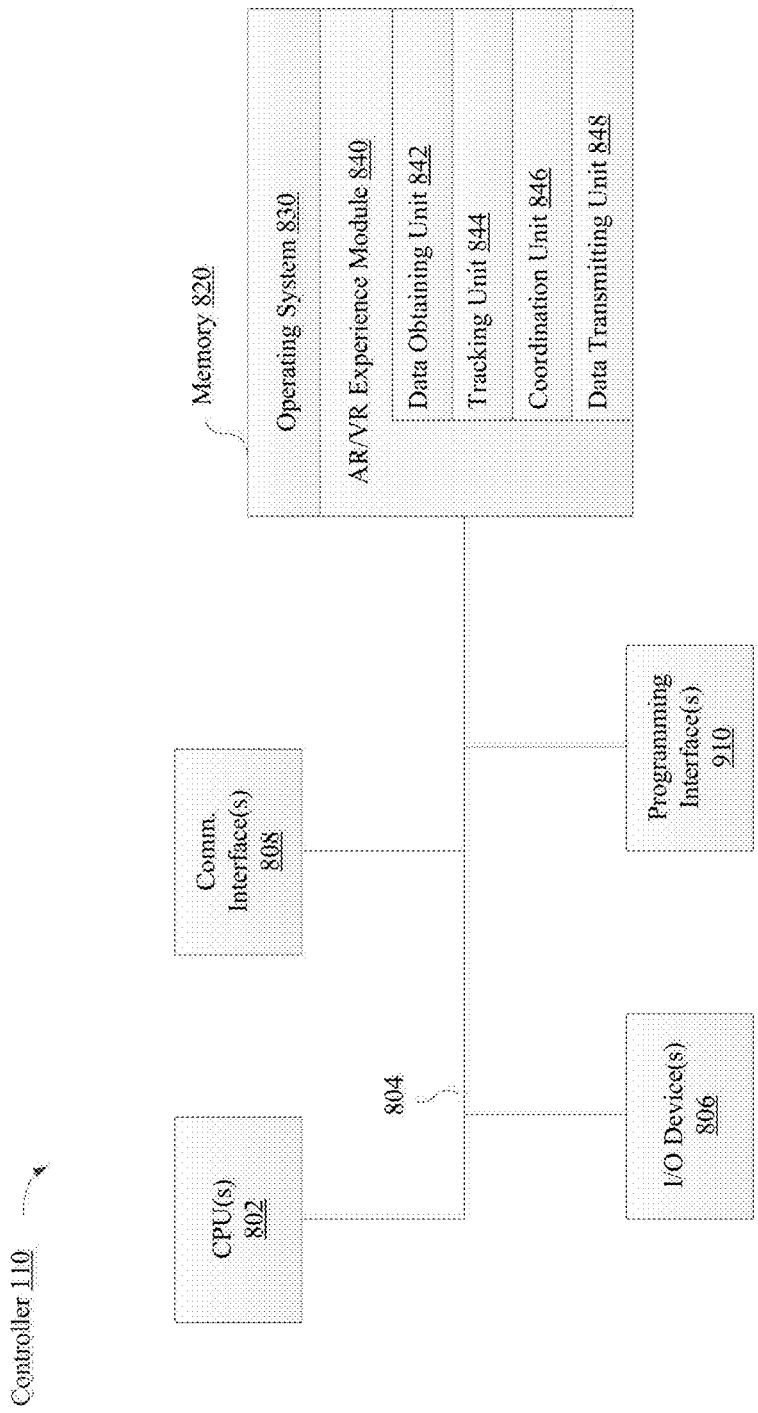
FIG. 8 is a block diagram of an example controller, in accordance with some implementations.

FIG. 8 is a block diagram of an example of controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations controller 110 includes one or more processing units 802 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 806, one or more communication interfaces 808 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 810, a memory 820, and one or more communication buses 804 for interconnecting these and various other components.

In some implementations, the one or more communication buses 804 include circuitry that interconnects and controls communications between system components. In some implementations, the one or more I/O devices 806 include at least one of a keyboard, a mouse, a touchpad, a joystick, one or more microphones, one or more speakers, one or more image sensors, one or more displays, and/or the like.

The memory 820 includes high-speed random-access memory, such as dynamic random-access memory (DRAM), static random-access memory (SRAM), double-data-rate random-access memory (DDR RAM), or other random-access solid-state memory devices. In some implementations, the memory 820 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and an augmented reality/virtual reality (AR/VR) experience module 840.

The operating system 830 includes procedures for handling various basic system services and for performing hardware dependent tasks. In some implementations, the AR/VR experience module 840 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 840 includes a data obtaining unit 842, a tracking unit 844, a coordination unit 846, and a data transmitting unit 848.

In some implementations, the data obtaining unit 842 is configured to obtain data (e.g., presentation data, interaction data, sensor data, location data, etc.) from one or more of HMD 120 and secondary device 130. To that end, in various implementations, the data obtaining unit 842 includes instructions and/or logic therefor, and heuristics and metadata therefor.

In some implementations, the tracking unit 844 is configured to map the scene 105 and to track the position/location of one or more of HMD 120 and secondary device 130 with respect to the scene 105. To that end, in various implementations, the tracking unit 244 includes instructions and/or logic therefor, and heuristics and metadata therefor.

In some implementations, the coordination unit 846 is configured to manage and coordinate the AR/VR experience presented to the user by the HMD 120. To that end, in various implementations, the coordination unit 846 includes instructions and/or logic therefor, and heuristics and metadata therefor.

In some implementations, the data transmitting unit 848 is configured to transmit data (e.g., presentation data, location data, etc.) to one or more of HMD 120 and secondary device 130. To that end, in various implementations, the data transmitting unit 848 includes instructions and/or logic therefor, and heuristics and metadata therefor.

Although the data obtaining unit 842, the tracking unit 844, the coordination unit 846, and the data transmitting unit 848 are shown as residing on a single device (e.g., the controller 110), it should be understood that in other implementations, any combination of the data obtaining unit 842, the tracking unit 844, the coordination unit 846, and the data transmitting unit 848 may be located in separate computing devices.

Figure 9:
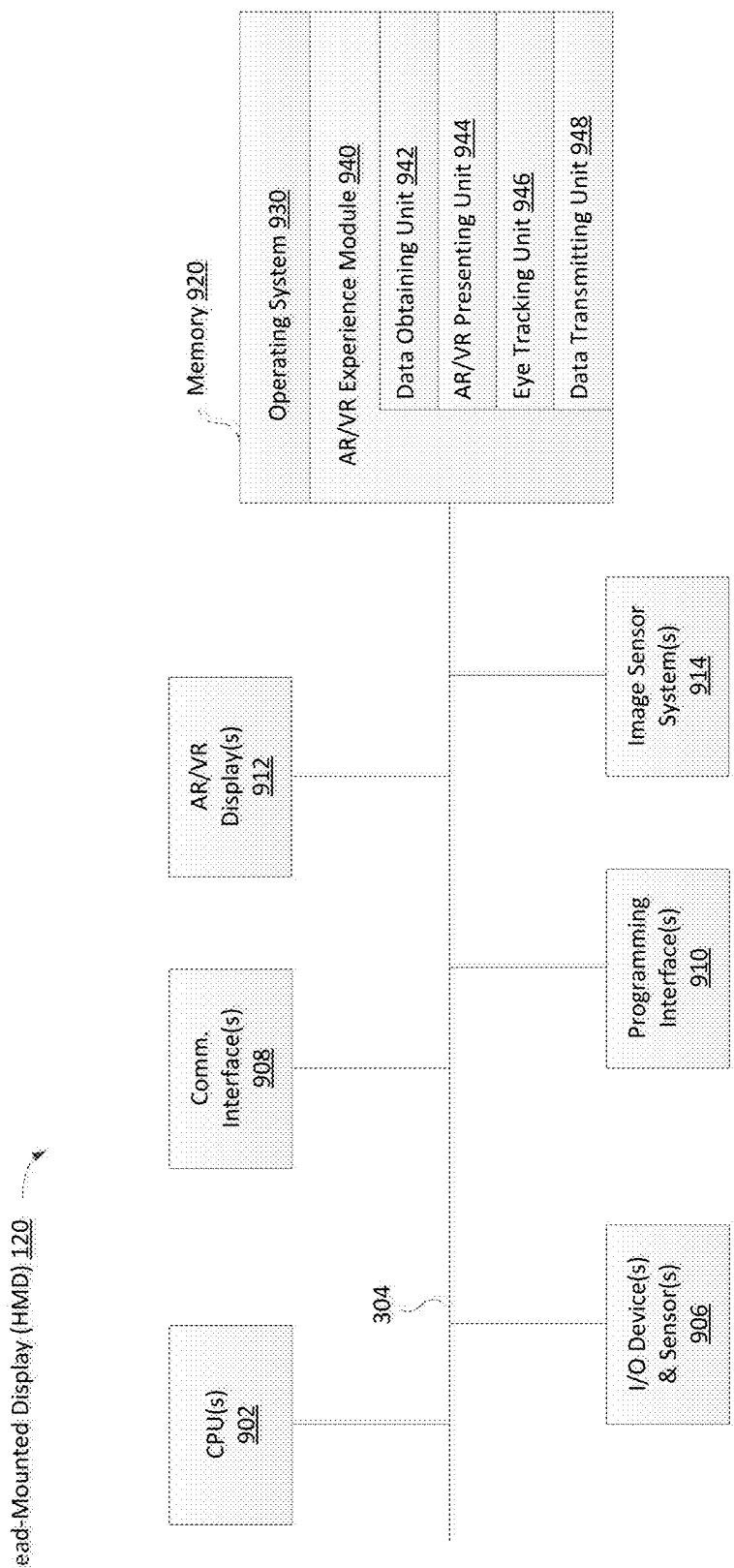
FIG. 9 is a block diagram of an example HMD, in accordance with some implementations.

FIG. 9 is a block diagram of an example of HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations HMD 120 includes one or more processing units 902 (e.g., microprocessors, ASICs, FPGAs, GPUs, CPUs, processing cores, and/or the like), one or more I/O devices and sensors 906, one or more communication interfaces 908 (e.g., USB, FIREWIRE, THUN- DERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more AR/VR displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 912 are configured to present the AR/VR experience to the user. In some implementations, the one or more AR/VR displays 912 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), and/or the like display types. In some implementations, the one or more AR/VR displays 912 correspond to diffractive, reflective, polarized, holographic, etc. waveguide displays. For example, HMD 120 includes a single AR/VR display. In another example, HMD 120 includes an AR/VR display for each eye of the user. In some implementations, the one or more AR/VR displays 912 are capable of presenting AR and VR content. In some implementations, the one or more AR/VR displays 912 are capable of presenting AR or VR content.

In some implementations, the one or more image sensor systems 914 are configured to obtain image data that corresponds to at least a portion of the face of the user that includes the eyes of the user. For example, the one or more image sensor systems 914 include one or more RGB camera (e.g., with a complimentary metal-oxide-semiconductor ("CMOS") image sensor or a charge-coupled device ("CCD") image sensor), monochrome camera, IR camera, event-based camera, and/or the like. In various implementations, the one or more image sensor systems 914 further include illumination sources that emit light upon the portion of the face of the user, such as a flash or a glint source.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930, an AR/VR presentation module 940, and a user data store 960.

The operating system 930 includes procedures for handling various basic system services and for performing hardware dependent tasks. In some implementations, the AR/VR presentation module 940 is configured to present AR/VR content to the user via the one or more AR/VR displays 912. To that end, in various implementations, the AR/VR presentation module 940 includes a data obtaining unit 942, an AR/VR presenting unit 944, an eye tracking unit 946, and a data transmitting unit 948.

In some implementations, the data obtaining unit 942 is configured to obtain data (e.g., presentation data, interaction data, sensor data, location data, etc.) from one or more of controller 110 and secondary device 130. To that end, in various implementations, the data obtaining unit 942 includes instructions and/or logic therefor, and heuristics and metadata therefor.

In some implementations, the AR/VR presenting unit 944 is configured to present AR/VR content via the one or more AR/VR displays 912. To that end, in various implementations, the AR/VR presenting unit 944 includes instructions and/or logic therefor, and heuristics and metadata therefor.

In some implementations, the eye tracking unit 946 is configured to determine an eye tracking characteristic of a user based on event messages received from an event camera. To that end, in various implementations, the eye tracking unit 946 includes instructions and/or logic therefor, and heuristics and metadata therefor.

In some implementations, the data transmitting unit 948 is configured to transmit data (e.g., presentation data, location data, etc.) to one or more of controller 110 and secondary device 130. To that end, in various implementations, the data transmitting unit 948 includes instructions and/or logic therefor, and heuristics and metadata therefor.

Although the data obtaining unit 942, the AR/VR presenting unit 944, the eye tracking unit 946, and the data transmitting unit 948 are shown as residing on a single device (e.g., HMD 120), it should be understood that in other implementations, any combination of the data obtaining unit 942, the AR/VR presenting unit 944, the eye tracking unit 946, and the data transmitting unit 948 may be located in separate computing devices.

FIGS. 8-9 are each intended more as functional description of the various features which are present in a particular implementation as opposed to a structural schematic of the implementations described herein. As recognized by those of ordinary skill in the art, items shown separately could be combined and some items could be separated. For example, some functional modules shown separately in any of FIGS. 8-9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Some implementations provide a system that includes:

a head-mounted device (HMD) having a first plurality of optical sources to emit light and a first event camera to output a first stream of pixel events generated by a first plurality of pixel sensors, the first plurality of optical sources and the first plurality of pixel sensors disposed at known locations relative to an HMD reference frame;

a secondary device physically unassociated with the HMD comprising a second plurality of optical sources to emit light and a second event camera to output a second stream of pixel events generated by a second plurality of pixel sensors, the second plurality of optical sources and the second plurality of pixel sensors disposed at known locations relative to a secondary device reference frame; and a first control node communicatively coupled to the HMD to determine correspondences between the HMD and the secondary device by mapping location data generated in the HMD reference frame for a set of second optical sources among the second plurality of optical sources to respective known locations of the set of second optical sources relative to the secondary device reference frame, wherein the set of second optical sources are identified by recognizing defined illumination parameters associated with the set of second optical sources in light intensity data obtained from the first stream of pixel events.

In the system, the HMD may include an inertial measurement unit (IMU) to provide inertial data corresponding to movement of the HMD in a global reference frame.

In the system, the HMD may be adapted to normalize content presented in a display of the HMD to the global reference frame using the inertial data, the content including augmented reality content, virtual reality content, or a combination thereof.

The system may further include a second control node communicatively coupled to the secondary device to determine correspondences between the secondary device and the HMD by mapping location data generated in the secondary device reference frame for a set of first optical sources among the first plurality of optical sources to respective known locations of the set of first optical sources relative to the HMD reference frame, wherein the set of first optical sources are uniquely identified by recognizing defined illumination parameters associated with the set of first optical sources in light intensity data obtained from the second stream of pixel events.

The system may further include a computing device to generate graphics data for display on a screen of the HMD based on receiving correspondence data comprising the correspondences between the HMD and the secondary device and the correspondences between the secondary device and the HMD, the computing device physically unassociated with the secondary device and the HMD.

In the system, discrepancies between the respective correspondences may be resolved using data exchanged between the first control node and the second control node.

In the system, the secondary device may control a computing device that generates graphics data for display on a screen of the HMD, the computing device physically unassociated with the secondary device and the HMD.

In the system, the secondary device may provide user input to a computing device that generates graphics data for display on a screen of the HMD, the computing device physically unassociated with the secondary device and the HMD.

In the system, the HMD includes a display to present augmented reality content, virtual reality content, or a combination thereof.

Some implementations provide a system that includes:

an event camera to output a stream of pixel events generated by a plurality of pixel sensors disposed at known locations relative to a first reference frame;

a device physically unassociated with the event camera comprising a plurality of optical sources configured to emit light, the plurality of optical sources disposed at known locations relative to a second reference frame; and a control node communicatively coupled to the event camera to determine correspondences between the event camera and the device by mapping location data generated in the first reference frame for a set of optical sources among the plurality of optical sources to respective known locations of the set of optical sources relative to the second reference frame, wherein the set of optical sources are identified by recognizing defined illumination parameters associated with the set of optical sources in light intensity data obtained from the stream of pixel events.

In the system, the defined illumination parameters may include a first wavelength associated with light emitted by a first subset of optical sources and a second wavelength associated with light emitted by a second subset of optical sources that is different from the first wavelength, the first and second subsets of optical sources among the plurality of optical sources.

The system may also perform operations including filtering the light intensity data according to a frequency range to partition light intensity data corresponding to a visible wavelength range from light intensity data corresponding to a non-visible wavelength range.

In the system, the light intensity data corresponding to the non-visible wavelength range may include the light emitted by the plurality of optical sources.

The system may also perform operations including determining a correspondence between an object in a scene disposed within a field of view of the event camera and the event camera using the light intensity data corresponding to the visible wavelength range.

In the system, the defined illumination parameters may include a portion of an illumination pattern of the plurality of optical sources that corresponds to the set of optical sources.

In the system, the set of optical sources may include at least three optical sources of the plurality of optical sources.

In the system, the event camera may be coupled to an inertial measurement unit (IMU) to provide inertial data corresponding to movement of the event camera in a global reference frame.

In the system, the control node may be adapted to normalize the correspondences between the event camera and the device to the global reference frame using the inertial data.

In the system, the plurality of optical sources may include an optical source to emit light in a near-infrared wavelength range, an optical source to emit light in an ultra-violet wavelength range, or a combination thereof.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of determining a correspondence between a secondary device and a head-mounted device (HMD) physically unassociated with the secondary device, the method comprising:
    at the HMD with a processor, non-transitory memory, and an event camera including a plurality of pixel sensors disposed on the event camera at known locations relative to an HMD reference frame:
    obtaining light intensity data indicative of an intensity of light incident on the plurality of pixel sensors from a stream of pixel events output by the event camera, at least a portion of the light is emitted by a plurality of optical sources disposed on the secondary device at known locations relative to a secondary device reference frame, each respective pixel event is generated in response to a particular pixel sensor detecting a change in light intensity that exceeds a comparator threshold;
    identifying a set of optical sources among the plurality of optical sources that are visible to the event camera by recognizing defined illumination parameters associated with the set of optical sources using the light intensity data;
    generating location data in the HMD reference frame for the set of optical sources, the location data in the HMD reference frame generated using the light intensity data; and
    determining the correspondence between the secondary device and the HMD by mapping the location data in the HMD reference frame to respective known locations of optical sources of the set of optical sources relative to the secondary device reference frame.

2. The method of claim 1 further comprising:
    updating a display of the HMD based on the determined correspondence between the secondary device and the HMD.

3. The method of claim 1, wherein the defined illumination parameters include a first wavelength associated with light emitted by a first subset of optical sources and a second wavelength associated with light emitted by a second subset of optical sources that is different from the first wavelength, the first and second subsets of optical sources among the plurality of optical sources.

4. The method of claim 1 further comprising:
    filtering the light intensity data according to a frequency range to partition light intensity data corresponding to a visible wavelength range from light intensity data corresponding to a non-visible wavelength range.

5. The method of claim 4, wherein the light intensity data corresponding to the non-visible wavelength range includes the light emitted by the plurality of optical sources.

6. The method of claim 4 further comprising:
    determining a correspondence between an object in a scene disposed within a field of view of the event camera and the HMD using the light intensity data corresponding to the visible wavelength range.

7. The method of claim 1, wherein the defined illumination parameters include a portion of an illumination pattern of the plurality of optical sources that corresponds to the set of optical sources.

8. The method of claim 1, wherein the set of optical sources includes at least three optical sources of the plurality of optical sources.

9. The method of claim 1, wherein the secondary device controls a computing device that generates graphics data for display on a screen of the HMD, the computing device physically unassociated with the secondary device and the HMD.

10. The method of claim 1, wherein the secondary device provides user input to a computing device that generates graphics data for display on a screen of the HMD, the computing device physically unassociated with the secondary device and the HMD.

11. The method of claim 1, wherein the HMD includes a display to present augmented reality content, virtual reality content, or a combination thereof.

12. A system comprising:
a head-mounted device (HMD) having a plurality of optical sources to emit light, the plurality of optical sources disposed at known locations relative to an HMD reference frame;
a secondary device physically unassociated with the HMD comprising an event camera having a plurality of pixel sensors arranged to receive the light emitted by the plurality of optical sources, the event camera to output a stream of pixel events generated by the plurality of pixel sensors, each of the plurality of pixel sensors disposed on the event camera at a known location relative to a secondary device reference frame and adapted to generate a respective pixel event in response to a breach of a respective comparator threshold indicative of an intensity of light incident on a respective pixel sensor; and
a control node coupled to the secondary device to determine a correspondence between the HMD and the secondary device by mapping location data generated in a secondary device reference frame for a set of optical sources among the plurality of optical sources to respective known locations of the set of optical sources relative to the HMD reference frame,
wherein the set of optical sources are uniquely identified by recognizing defined illumination parameters associated with the set of optical sources in light intensity data obtained from the stream of pixel events.

13. The system of claim 12, wherein the secondary device includes an inertial measurement unit (IMU) to provide inertial data corresponding to movement of the secondary device in a global reference frame.

14. The system of claim 13, wherein the control node is adapted to normalize the correspondence between the HMD and the secondary device to the global reference frame using the inertial data.

15. The system of claim 12, wherein the secondary device controls a computing device that generates graphics data for display on a screen of the HMD, the computing device physically unassociated with the secondary device and the HMD.

16. The system of claim 12, wherein the secondary device provides user input to a computing device that generates graphics data for display on a screen of the HMD, the computing device physically unassociated with the secondary device and the HMD.

17. The system of claim 12, wherein the HMD includes a display to present augmented reality content, virtual reality content, or a combination thereof.

18. The system of claim 12, wherein the plurality of optical sources comprise: an optical source to emit light in a near-infrared wavelength range, an optical source to emit light in an ultra-violet wavelength range, or a combination thereof.

19. A system comprising:
a head-mounted device (HMD) having a first plurality of optical sources to emit light and a first event camera to output a first stream of pixel events generated by a first plurality of pixel sensors, the first plurality of optical sources and the first plurality of pixel sensors disposed at known locations relative to an HMD reference frame;
a secondary device physically unassociated with the HMD comprising a second plurality of optical sources to emit light and a second event camera to output a second stream of pixel events generated by a second plurality of pixel sensors, the second plurality of optical sources and the second plurality of pixel sensors disposed at known locations relative to a secondary device reference frame; and
a first control node communicatively coupled to the HMD to determine correspondences between the HMD and the secondary device by mapping location data generated in the HMD reference frame for a set of second optical sources among the second plurality of optical sources to respective known locations of the set of second optical sources relative to the secondary device reference frame,
wherein the set of second optical sources are identified by recognizing defined illumination parameters associated with the set of second optical sources in light intensity data obtained from the first stream of pixel events.

20. The system of claim 19, wherein the HMD includes an inertial measurement unit (IMU) to provide inertial data corresponding to movement of the HMD in a global reference frame.

* * * * *